Feb. 5, 1946. H. J. NESS 2,394,002
METALLURGICAL FURNACE
Filed Aug. 22, 1942 4 Sheets-Sheet 3
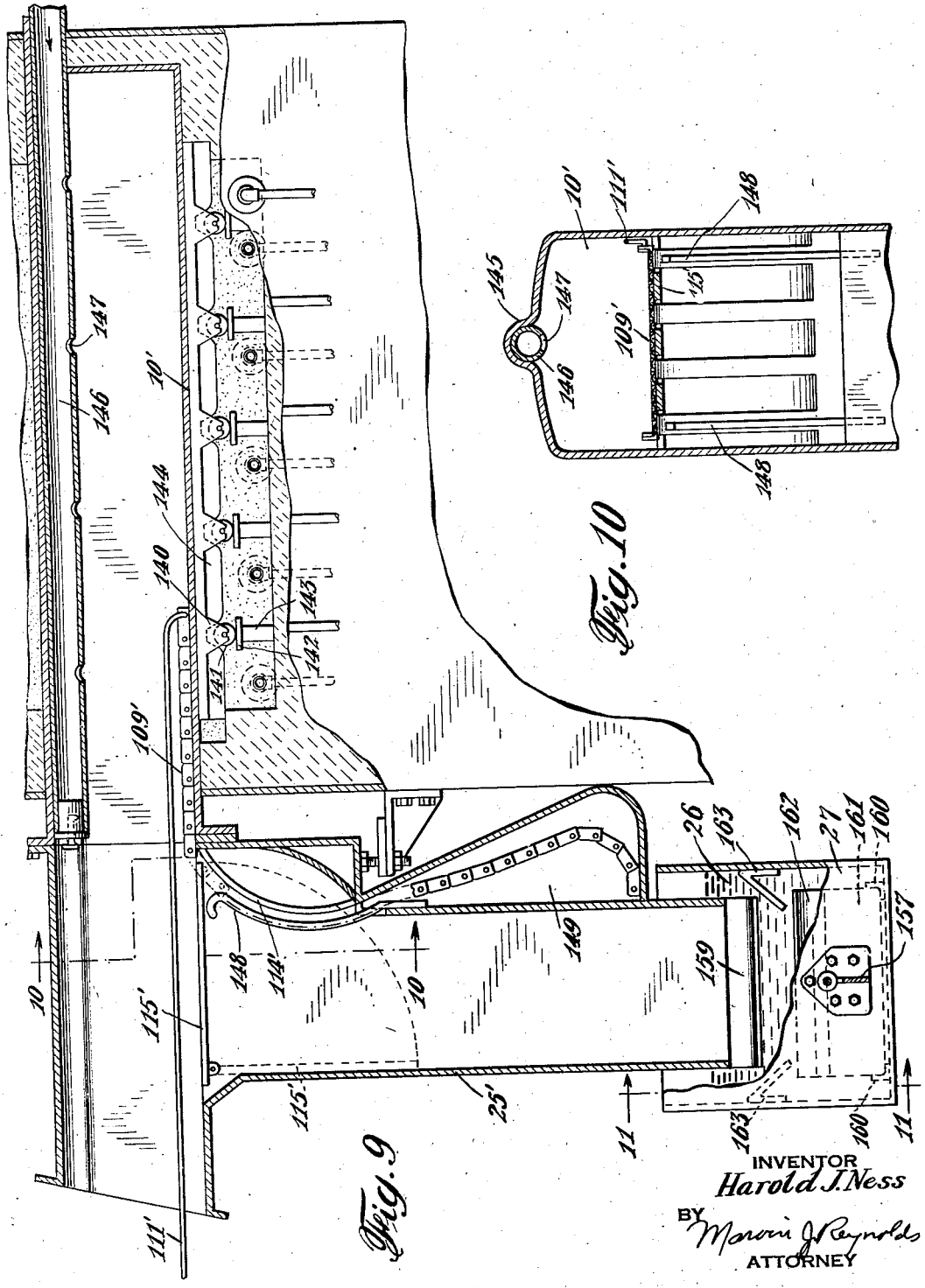

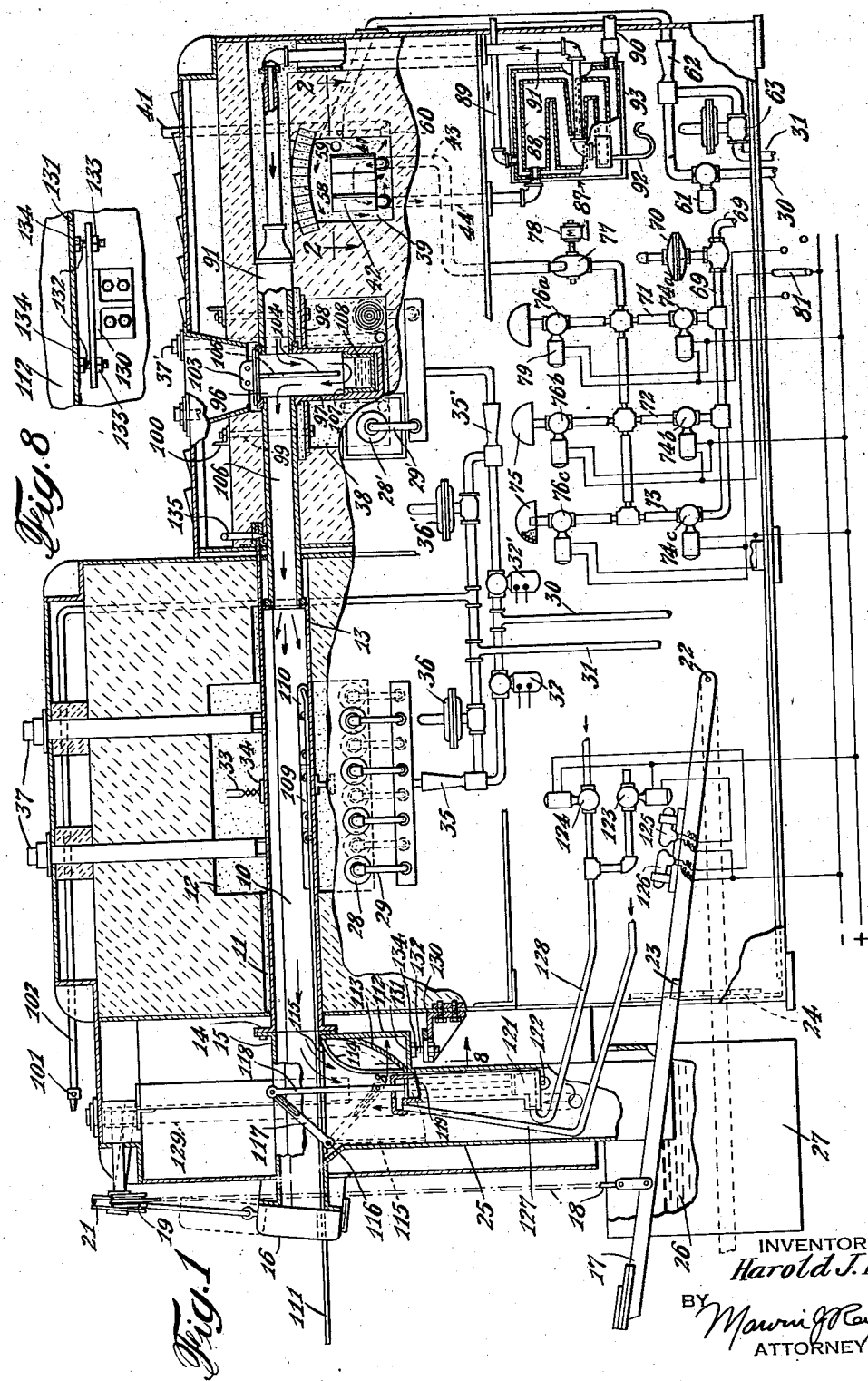

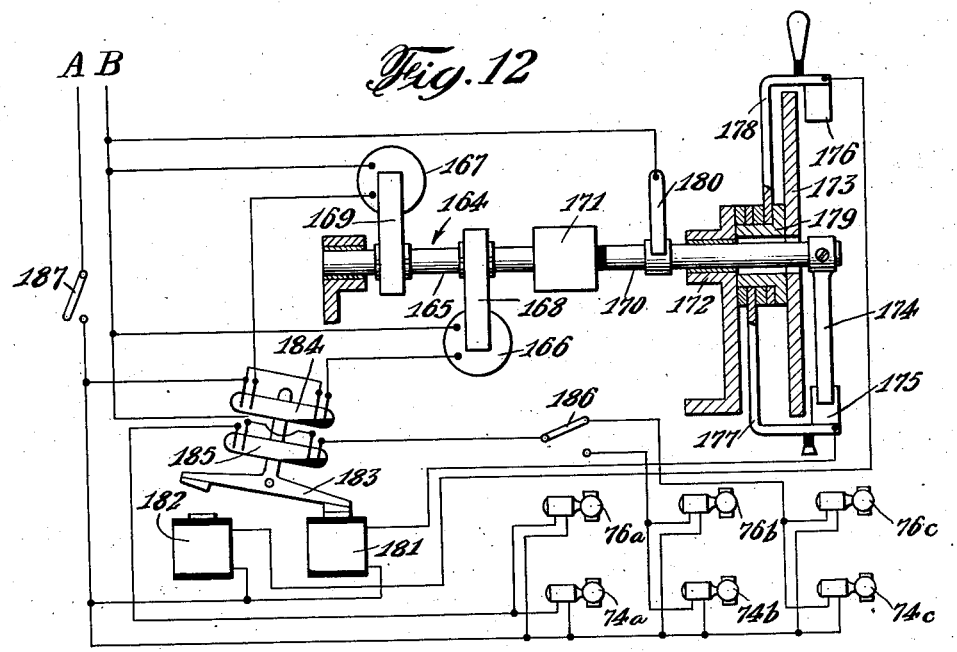
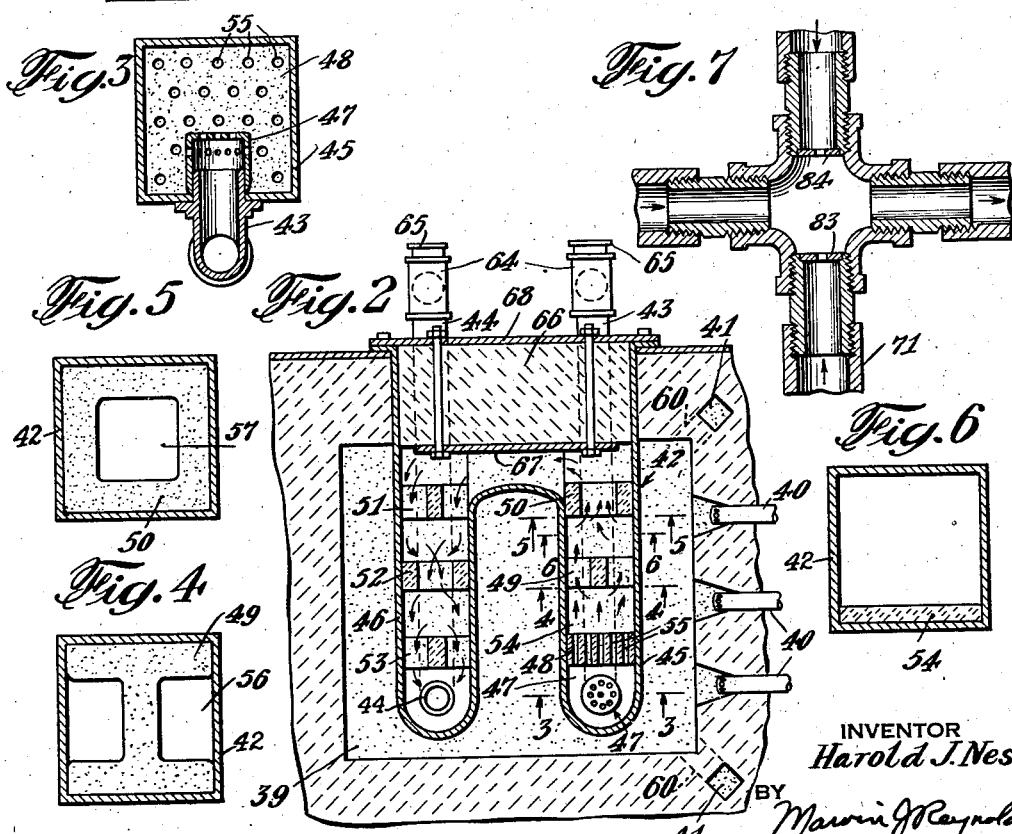

Feb. 5, 1946.  H. J. NESS  2,394,002
METALLURGICAL FURNACE
Filed Aug. 22, 1942  4 Sheets-Sheet 4
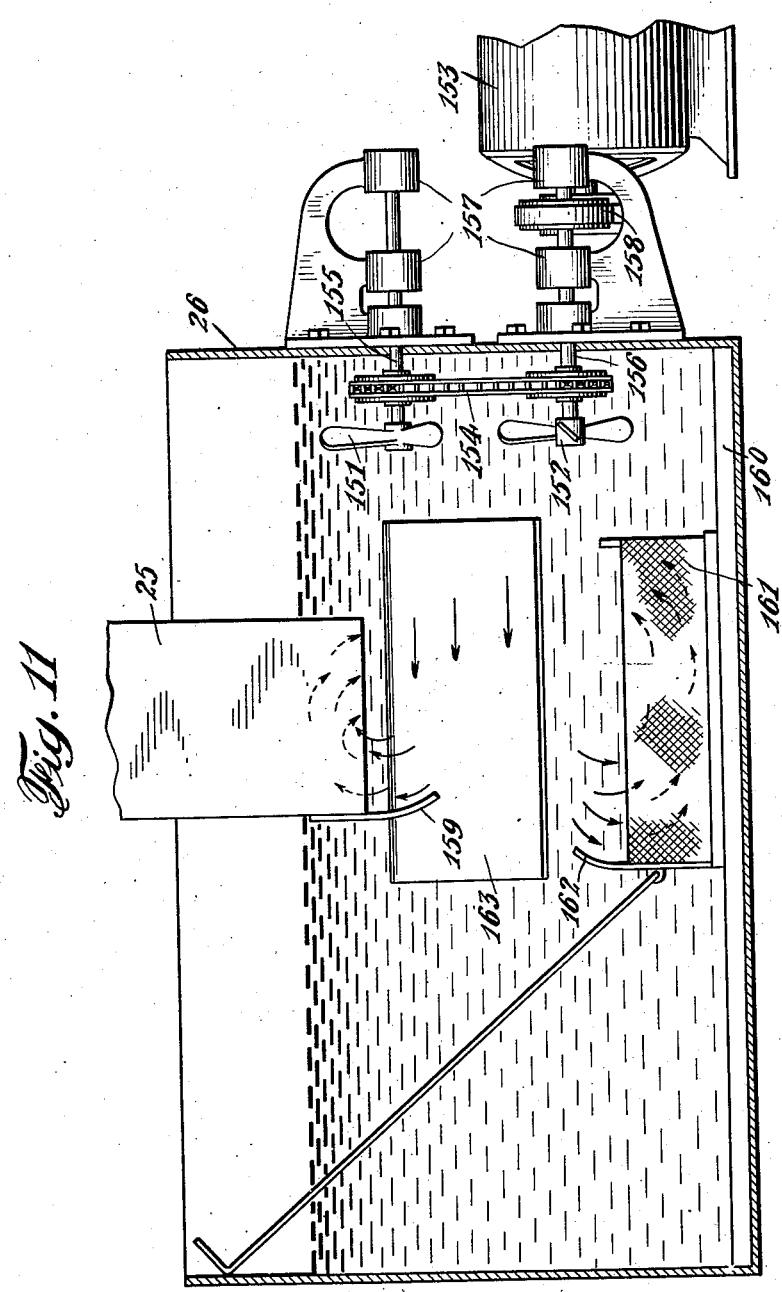
INVENTOR
Harold J. Ness
BY Marvin J. Reynolds
ATTORNEY Patented Feb. 5, 1946

2,394,002

UNITED STATES PATENT OFFICE 2,394,002

METALLURGICAL FURNACE

Harold J. Ness, Nutley, N. J., assignor to Metallurgical Processes Co., a partnership consisting of Harold J. Ness and Martin A. Ness, both of Nutley, and Alfred R. Becker and Marvin J. Reynolds, both of Montclair, N. J.

Application August 22, 1942, Serial No. 455,720

24 Claims. (Cl. 266—5)

This invention relates to furnaces and more particularly to a method of and means for producing furnace atmospheres suitable for the heat treating of metals and other materials which are liable to contamination by the usual furnace atmospheres, or for the carburization of iron and steel.

In the usual furnace atmospheres it is not possible to heat treat metals, such as iron and steel, without considerable oxidation and decarburization thereof. The carbon dioxide, water vapor or any free oxygen in the furnace act to scale or oxidize the metal, and the hydrogen and nitrogen in the presence of traces of oxygen or water vapor, are strong decarburizing agents.

Heretofore, in the operation of heat treating atmosphere furnaces efforts have been made to prevent oxidation and decarburization by regulating the ratios between the various ingredients of the furnace atmosphere. Stansel and Dantsizen in the General Electric Review for March and May, 1939, have shown, however, that the ratio between the various components of a furnace atmosphere which will not scale are radically different from the ratios required in order to prevent carburization or decarburization of steel. It, therefore, has not been possible to prevent both oxidation and decarburization or carburization of the treated metal merely by adjustment of the ratios of the reducing gases, such as carbon monoxide, hydrogen and methane, to the oxidizing gases, such as carbon dioxide and water vapor. The present invention is concerned with the elimination of these difficulties and in obtaining a furnace atmosphere for the heat treating of metals in which all three of these detrimental actions are eliminated. This is accomplished by introducing an additional component into the furnace atmosphere, namely, lithium or a compound of lithium, which overcomes the tendency of the heat treating atmosphere to either effect oxidation, carburization or decarburization of the metals being heated and which therefore, renders it unnecessary to effect a balance between the various components resulting from combustion of the gases.

In my prior Patent No. 2,181,093, granted November 21, 1939, there is described one method of producing a lithium containing atmosphere in a furnace in which various metals may be heated in the presence of ordinary combustion gases without detrimental oxidation or decarburization. In accordance with the disclosure of that patent, a compound of lithium, such as the carbonate, is introduced into the furnace atmosphere in powdered form. In order to obtain a uniform flow of the compound in minute quantities, the compound is atomized by agitation and by passing air or other gas therethrough to produce a suspension of the compound in the gas. The required quantity of the compound laden gas may then be introduced into the furnace mixed with the air or fuel or independently thereof. It is believed that in the heat of the furnace the lithium compound or a portion thereof is reduced to lithium oxide which reacts with the carbon monoxide present in the furnace gases to liberate lithium metal in accordance with the following equation:

$$2Li_2O + CO = Li_2CO_3 + 2Li$$ 

The lithium is thus freed to combine with the oxygen of the furnace atmosphere or with oxygen that may be occluded in the metal being heated. The lithium carbonate of the above reaction is again thermally broken down to lithium oxide, liberating carbon dioxide. The reaction is then repeated with the lithium oxide so formed.

In my copending application Serial No. 384,641, filed March 22, 1941, now Patent No. 2,346,698, granted April 18, 1944, and entitled "Controlled atmosphere furnace," of which the present application is a continuation in part, there is disclosed a method of and apparatus for introducing lithium or lithium compounds into a furnace for accomplishing the purpose of the aforesaid patent. In accordance with the disclosure of said application, the lithium, or a compound or mixtures of compounds thereof, is vaporized and introduced into the treating chamber of the furnace by means of a carrier gas. This carrier gas may be a non-oxidizing medium, such as nitrogen, or hydrogen, although a gas resulting from the combustion of a liquid or gaseous fuel is preferred. Air may also be employed as a carrier gas, if desired.

The amount of lithium required for conditioning the atmosphere of the furnace in the manner described in said later application is extremely small; for instance, a muffle furnace heated to about 1400° F. and having a volume of approximately two thousand cubic inches and a gas flow of approximately one hundred cubic feet per hour, may be completely conditioned for a period of fifteen hours or more with six ounces of a lithium compound mixture composed of 40% lithium chloride and 60% lithium carbonate.

The present invention is an improvement upon the invention of said application, one of the objects thereof being to still further reduce the amount of lithium compound required to condition the atmosphere.

Another object is to produce a heat treating atmosphere in which there will be no discoloration or staining of the metal being heated.

A further object is to permit generation or production of a lithium containing protective atmosphere at relatively low temperatures.

Another object is to provide a furnace which may be employed interchangeably for both heat treating of metals or for carburization of iron or steel.

A further object is to provide a furnace atmosphere in which bright or clean carburizing may be effected and further in which such carburizing may be accomplished at relatively low temperatures and at higher rates of penetration than has been obtained in prior art methods.

A still further object is to effect an economy in the use of the carburizing gas.

Still another object is to provide a completely dry atmosphere in the furnace throughout the entire heating chamber and during all conditions of operation thereof.

A still further object is to provide a novel furnace construction in which the foregoing objects may be accomplished.

Other objects and advantages will hereinafter appear.

The detrimental effects of water vapor in the furnace atmosphere has been long appreciated and extreme precautions have been taken in an effort to prevent its introduction into the furnace. For this purpose involved refrigerating and dehydrating apparatus has been provided in order to reduce the moisture content in the products of combustion to a negligible degree. However, such methods have not been effective to produce a dry atmosphere in the furnace since in the reheating of the gases to the furnace temperature, water vapor is again formed. The introduction of lithium or its compounds into the furnace atmosphere, as set forth in the aforesaid applications, overcomes or neutralizes the detrimental effects of water vapor in the furnace atmosphere or acts to prevent its formation, so that the provision of drying apparatus is unnecessary. However, applicant has discovered that improved operation of the furnace may be obtained by the elimination of a portion of the water vapor from the treating gases prior to the introduction thereof into the heating chamber, this improvement residing primarily in the ability to produce the non-oxidizing and non-decarburizing heat treating atmosphere or the desired carburizing atmosphere with a reduced quantity of lithium compound; in producing the requisite amount of lithium in the atmosphere at lower temperatures; in the maintenance of such protective atmosphere at materially lower heat treating or carburizing temperatures; and in an improvement in the surface condition of the treated metals.

In accordance with the present invention the air and fuel mixture may be burned in the usual manner or they may be cracked by externally applied heat without combustion, either operation producing an increase in the moisture content above that of the original mixture. The cracked or burned gases are then partially dehydrated by cooling, preferably to a temperature of from 50 to 100 degrees F. Further cooling of the gases or the use of supplemental drying apparatus is of no advantage since, according to Sam Tour in a paper entitled "Water vapor in furnace atmospheres," published in the Transactions of the American Society for Metals for 1941, at page 710, in the reheating of the gases to the treating temperature, water vapor may again be formed in amounts of from 3 to 5% or more. The condensed water vapor is then removed from the cooled gases and the vapor produced from heating of a lithium compound is introduced into the gas. The gases are then reheated and introduced in the heating chamber of the furnace. The formation of water vapor ordinarily incident to the reheating of the gases is either inhibited or its effectiveness neutralized by the presence of the lithium in the atmosphere. The partial removal of the water vapor greatly reduces the work which the lithium is required to do and therefore, enables the atmosphere to be conditoned with a lesser amount of lithium. For instance, a furnace of the muffle type ordinarily requiring the consumption of six ounces of lithium compounds over a period of fifteen hours for the conditioning of the furnace, when no drying is employed, may, with the removal of a portion of the water vapor, be conditioned with an equal amount of the same compound for a period of approximately sixty hours. Moreover, whereas it required a temperature of about 1750° F. to generate the required amount of lithium to condition the atmosphere without the removal of water vapor, a sufficient quantity to effect the desired result may be produced at a temperature of about 1400° F. after removal of the aforesaid portion of the water vapor. The activity of the lithium in the furnace atmosphere is dependent to some extent upon the temperature existing in the furnace, but when the water vapor is reduced by the precooling of the gases, the amount of lithium required to neutralize its effect is so small that sufficient activity is obtained at much lower temperatures than would otherwise be possible and a satisfactorily conditioned heat treating atmosphere may be created and maintained at temperatures as low as 600° F. Another very important advantage in the use of extremely small quantities of lithium in the treating atmosphere is the absolutely clean and bright surface of the treated parts on their removal from the furnace. This bright surface is obtained both when using a non-carburizing atmosphere as in annealing, hardening, tempering, etc., and when using a carburizing mixture in the furnace. As will hereinafter appear, and as pointed out in Patent No. 2,240,146, entitled "Carburizing ferrous metals," while lithium is effective to prevent carburization in ordinary heat treating atmospheres, it acts in the presence of a carburizing gas mixture to accelerate carburization, and to enable carburization to be carried out at much lower temperatures than heretofore has been possible in gas carburizing processes.

The invention will best be understood by reference to the accompanying drawings, in which:

Fig. 1 is a vertical sectional view of an atmosphere furnace embodying the present invention;

Fig. 2 is a sectional view of the gas generating chamber taken on the line 2—2 of Fig. 1;

Figs. 3, 4, 5, and 6 are sectional views of the carrier gas generating chamber taken on the lines 3—3; 4—4; 5—5; and 6—6, respectively, of Fig. 2;

Fig. 7 is a sectional view of a gas and air mixing device for supplying a regulated mixture thereof to the carrier gas generating chamber;

Fig. 8 is a sectional view taken on the line 8—8 of Fig. 1;

Fig. 9 is a vertical sectional view of a modified form of muffle, work conveying belt, and quenching chute;

Fig. 10 is a view on the line 10—10 of Fig. 9;

Fig. 11 is a vertical sectional view of the quenching tank, taken on the line 11—11 of Fig. 9; and Fig. 12 is a schematic view of a timing mechanism and circuits controlled thereby for predetermining the operation of air and gas inlet valves for supplying, alternately, a carburizing and a heat treating atmosphere to the furnace.

Referring first to Fig. 1, the furnace there shown comprises a muffle 10 of rectangular cross section composed preferably of a heat resisting metal such as nickel or nickel-chromium alloy. Since the interior of the muffle is continuously provided with a protective or non-oxidizing atmosphere, the muffle may be composed of an iron or steel inner lining, preferably welded at one end to the nickel or nickel-chromium alloy jacket, or it may be composed entirely of copper plated iron or steel. The muffle 10 extends, at the forward end, through a rectangular opening 11 in the refractory combustion chamber 12. The rear of the muffle is shown terminating within an opening 13 in the rear wall of the refractory combustion chamber 12. The forward end of the muffle is provided with a flange 14 to which is secured a muffle extension 15 provided with a suitable door 16 at its outer end. The door may be controlled by means of a foot pedal 17 connected thereto through a flexible cable 18 passing over suitable pulleys 19 and 21. The pedal 17 is pivoted at 22 and is adapted to be held in any suitable raised position by means of a latch 23 thereon engaging in suitable notches in the serrated plate 24. Extending downwardly from the muffle extension 15 is a quenching chute 25 which terminates beneath the body of a quenching medium 26 contained within a suitable receptacle 27.

The muffle 10 is heated by two series of burners 28 extending into the combustion chamber 12 at opposite sides thereof beneath the muffle 10. The burners 28 are supplied with a combustible mixture of air and gas by conduits 29. The combustion chamber 12 is vented by a plurality of pipes 37 extending form a point just above the center of the muffle 10 through the refractory insulation and terminating above the furnace shell. This location of the vents allows the combustion gases passing up about the sides of the muffle, to sweep over the top thereof, and results in an extremely uniform heating of the muffle.

Situated to the rear of the combustion chamber is a vaporizing chamber 38 and a gas generating chamber 39. The vaporizing chamber 38 is provided with burners 28' supplied with a combustible mixture of gas and air by conduits 29', and is vented by ports 37'. The air and gas lines 30 and 31, respectively, are each provided with two branches, those in the air line having electrically controlled valves 32 and 32' therein, respectively, by which air under suitable pressure is supplied to a pair of Venturi mixing tubes 35 and 35' connected to the manifolds associated with the burners 28 and 28', respectively. The two branches of the gas line 31 are provided with pressure regulating valves 36 and 36', the outlet sides of which are connected to the throats of the Venturi tubes 35 and 35', respectively.

The electric valves 32 and 32' are operated under the control of thermocouples located in the combustion chambers 12 and 38, respectively, only the couple 33 associated with the chamber 12 being shown. This comprises a disc 34 of heat resisting and good heat conducting material, such as nickel or nickel-chromium alloy, disposed in a well or pocket formed in the top wall of the muffle, and having the junction of the thermocouple welded thereto.

The gas generating chamber is a substantially rectangular combustion chamber contained within a mass of refractory heat insulating material. It is provided with suitable burners 40 and vents 41. Disposed within the chamber 39 is a U-shaped cracking unit 42, also shown in Fig. 2. An air and gas mixture is introduced through the conduit 43 into one arm of the U-shaped cracking chamber and is withdrawn therefrom through the opposite arm by way of the conduit 44.

The inlet conduit 43 extends laterally into the combustion chamber 39 beneath one leg 45 of the cracking chamber 42, entering the latter at the rounded end thereof. The outlet conduit 44 is connected to the other leg 46 of the cracking chamber and extends laterally therebeneath. Within the cracking chamber the inlet conduit 43 is provided with a perforated head or nozzle 47 which serves to break up and mix the incoming gas and to cause a uniform distribution thereof within the space formed in the inlet end of the cracking chamber. Disposed within the legs 45 and 46 of the chamber 42 are a series of refractory baffle members 48 to 53 spaced by flat refractory spacers 54. The baffle members are variously shaped to effect a breaking up and slowing down of the gas and to cause a devious course of travel thereof, whereby coring of the gas is prevented and a scouring action of the gas, over a large area of contact with the walls of the chamber and the refractories therein, is obtained. In the embodiment shown, the refractory 48 is provided with a large number of small openings 55 to distribute and retard the gas; refractory 49 is provided with marginal openings 56 to force the gas to the side walls of the chamber; refractory 50 has a central aperture 57 to cause a change in direction of the gas and a crossing of the streams; and refractories 51, 52 and 53 have a side, central, and side openings, respectively, to continue this side-to-center and center-to-side movement, as indicated by the arrows in Fig. 2 of the drawings. Obviously, other arrangements of the refractory elements and the openings therein could be provided.

The cracking chamber 42 is maintained at a sufficiently high temperature to effect a cracking of the gas mixture passing therethrough, by the series of burners 40 directed into the combustion chamber 39 against the arched roof 58 thereof. A lighting opening 59 extends through a wall of the combustion chamber adjacent the burners 40 to facilitate lighting thereof and is normally closed by a removable refractory plug (not shown), as is well known in the art. The chamber is exhausted through the ports 60, at the lower corners beneath the burners, communicating with the vents 41 terminating above the furnace. The relative location of the burners and exhaust vents shown causes the combustion gases to sweep over and around the cracking chamber, as indicated by the arrows in Fig. 1. Any suitable burner control for maintaining the desired uniform temperature within the cracking chamber 42 may be provided, as for instance, an electric valve 61 in the air line 38, controlled by a suitable thermocouple in the chamber 39, and in turn controlling the amount of gas drawn through the venturi 62, from the gas line 31, the latter of which is provided with a gas pressure regulating valve 63.

The inlet and outlet conduits 43 and 44, extending as they do throughout the length of the combustion chamber 39, provide additional time for the cracking of the gases and additional hot surfaces for contact with the gases. By terminating these conduits exteriorly of the furnace in T-connections 64, provided with closure plugs 65, they are readily accessible for the removal of any sediment or condensation products which may accumulate therein. The chamber 42 is closed by a refractory end member 66 clamped between metal plates 67, 68 whereby access is readily had to the interior of the cracking chamber for removal of solid material deposited therein or for renewal or repair of the refractory inserts. This ability to readily clean the cracking chamber and the inlet and outlet conduits is extremely important as the cracking process, particularly with carburizing mixtures and with some grades of carbonaceous gas, produces heavy residues, which in time would interfere both with the free passage of gas therethrough and the proper heat exchange.

Butane, propane, natural gas or other hydrocarbon gases, mixed with a suitable proportion of air, may be supplied to the cracking chamber, the ratio of the hydrocarbon gas to air depending upon the analysis of the former and the purpose for which the furnace is to be used. For the heat treating of metals, where a neutral atmosphere is desired, I prefer to employ a ratio of approximately 1 part of propane to 18 parts of air, whereas for carburizing, a ratio of 1 part of propane to from 5 to 10 parts of air, depending upon the analysis of the gas employed and the type, analysis and quality of the carburized case desired, has proven highly satisfactory. In Fig. 1 the arrangement of valves, conduits, etc., for obtaining the requisite gas and air mixture has been shown diagrammatically. Hydrocarbon gas from any suitable source is provided through a conduit 69 provided with a zero governor 70 to maintain atmospheric pressure therein. The conduit 69 is provided with three branches 71, 72, 73, each having an electric valve 74a, 74b and 74c, respectively, therein whereby the gas may be permitted to flow through any one or more of the three branches. Air is supplied to each of the three branches through suitable filters 75 and electric valves 76a, 76b and 76c. A pump or blower 77 driven by a suitable motor 78 draws gas and air through any of the valves 74 and 76 which may be open at any instant, and forces the same under uniform pressure through the inlet conduit 43 into the cracking chamber 42. The valves 74a, 74b, 74c, and 76a, 76b and 76c are each provided with windings 79 controlled by a switch 81. With the switch 81 on its second contact, the windings of the valves 74a and 76a will be energized, causing the same to be opened, whereas the remaining valves 74b and 74c, and 76b and 76c will normally be closed so that the air and gas supplied to the cracking chamber will be determined only by the valves 74a and 76a. The ratio of air and gas supplied through these valves is determined by suitable orifices in the branch 71. Referring to Fig. 7, these orifices are shown in discs 83 and 84, in the gas and air lines, respectively, and are so proportioned as to produce a gas and air ratio of approximately 1 to 18. Consequently, when the switch 81 is on its second contact, such a mixture will be supplied to the cracking chamber and will result in the provision of a neutral gas atmosphere in the muffle 10, as will hereinafter appear.

With the switch 81 on its third contact, the windings of the valves 74b and 76b will be energized, the others remaining deenergized so that only the former will be opened to enable the gas and air mixture to be supplied through the branch 72. The orifices in this branch are so proportioned as to produce a gas and air mixture of approximately 1 to 6.5 to be supplied to the cracking chamber. This mixture results in a carburizing gas being supplied to the muffle capable of producing a case of from 0.9 to 1.0% carbon. The valves 74c and 76c are controlled through the fourth contact of switch 81. The orifices in the branch 73 are preferably so proportioned as to produce a gas and air ratio of 1 to 8. This ratio will effect a case of from 0.7 to 0.8% carbon. Additional branches and valves may be provided to supply other ratios of gas and air in order to effect other degrees of carburization. For instance, an intermediate ratio of one part air to 7 parts gas will effect a case of from 0.8 to 0.9%. It will be understood that the exact ratio for any particular case will depend upon the analysis of the gas employed. It is, however, independent of the time of carburizing. Increasing the time of treatment increases the depth of case but does not materially affect the concentration of combined carbon in the case.

In Fig. 1 the switch 81 has been shown as manually operable to provide either a heat treating or a carburizing atmosphere, but it will be understood that, if desired, it may be automatically controlled by suitable arrangements so that the atmosphere may be changed from carburizing to heat treating at any predetermined intervals. For instance, in carburizing of steel it is often desirable, after a predetermined carburizing period, to permit the work to soak in a neutral atmosphere for a further period in order to enable the carbides to penetrate and diffuse into the metal; and thereafter to repeat this cycle of carburization and diffusion one or more times. Such an arrangement will be described hereinafter, in connection with Fig. 12.

The air and gas mixture, whatever its proportion in passing through the chamber 42, is heated to the cracking temperature, preferably between 1800° to 1900° F., and the cracked gas is directed from the cracking chamber through the conduit 44 into a condensing chamber 87, (Fig. 1). This condenser comprises a water jacketed shell of substantially rectangular shape having a plurality of transversely extending hollow baffles 88 projecting alternately from opposite sides thereof and in communication with the water jacket whereby water from a suitable source 89 may be circulated through the jacket and through the interior of the baffles. The water is conducted from the jacket through a suitable outlet conduit 90. The cracked gas passes from conduit 44 into the condenser at the upper end thereof and circulates in a tortuous path around the baffles 88 and out of the condenser at the base thereof through a conduit 91. The upper surfaces of the baffles 88 are downwardly inclined towards the free ends thereof to enable the water, which is condensed from the cracked gas during the cooling thereof, to flow to the base of the condenser where it is removed by a suitable trap 92 at the point where the gases leave the condensing chamber.

To permit cleaning of the condenser, one side wall thereof is secured by suitable bolts or screws to a flange 93 formed about the casing of the condenser.

The cooled and partially dried gases are conducted by means of the conduit 91 into a lithium compound generating chamber 96. The chamber 96 comprises a metal pot 97 depending into the combustion chamber 38 from a heat resisting alloy plate 98 which forms the top wall of the chamber 38. The plate 98 is supported by hanger rods 99, also of heat resisting alloy, from angle irons 100 extending transversely of the furnace. The pot 97 is spaced above the bottom wall of the chamber 38 to permit gas circulation therebeneath and to permit downward expansion of the pot as it is brought up to temperature. The chamber 38 is provided, as stated, with a pair of burners 28' to which a combustible air and gas mixture is supplied. The pot 97 is provided with a close fitting cover 103 from which a partition plate 104 is suspended. The partition plate has an opening 105 therein in substantial alignment with the gas inlet conduit 91 and with the gas outlet conduit 106 by which the gases are conducted into the muffle 10. The pot 97 has an annular shoulder or seat 107 adjacent its lower end and supported thereon is a flanged cup 108 adapted to contain a lithium compound or a mixture of lithium compounds. The burners 28' are adjusted by a suitable pyrometer control as stated, so as to maintain the lithium compounds at a suitable temperature to produce substantial vaporization thereof. The carrier gases entering the pot 97 are deflected in part by the partition plate 104 so as to pass over the surface of the molten compounds whereby to entrain a portion of the vaporized material. The amount of gas deflected by the plate 104 may be regulated by the size of the opening 105.

The parts to be heated may be placed directly on the floor of the muffle 10 but I prefer to employ a conveyor, shown as comprising a series of inverted U-shaped plates 109 adapted to rest on the floor of the muffle. The rear plate 110 has a rod 111 secured thereto which is adapted to extend through a suitable slot in the furnace door 16.

The quenching chute 25 adjacent its upper end is provided at the rear thereof with an angular extension 112, bridged by a solid concave plate 113 and having a pair of convex rails 114 extending thereacross. Pivoted at the juncture of the upper end of the chute 25 and the forward end of the muffle extension 15 is a plate 115 which normally extends downwardly against the forward wall of the chute 25, as shown in dotted lines. This plate is secured to a shaft 116 extending externally of the chute where it is provided with an operating arm 117 pivoted to the upper end of a plunge rod 118 having a plunger 119 working within a cylinder 121 mounted on a pivot 122. The plunger is adapted to be operated pneumatically to move the plate 115 from the position shown in dotted lines in Fig. 1 to the horizontal position shown in full lines so as to bridge the upper end of the chute 25. The free end of the plate 115 is cut away adjacent each of the rails 114 to provide finger portions extending therebetween. It is controlled by means of suitable electric valves 123 and 124 operated by means of the foot pedal 17 through the mercury switches 125 and 126. The cylinder 121, at its upper end above the piston 119, is connected by a flexible conduit 127 to a source of low pressure air, and at its lower end, beneath the piston, it is connected by a flexible conduit 128 to the valve 124 by which it may be supplied with high pressure air. The valve 123 provides a connection from the conduit 128 to atmosphere. With the door 16 closed, the winding of the valve 124 is energized and the winding of valve 123 is deenergized to maintain the former closed and the latter open, connecting the conduit 128 to the atmosphere and permitting the low pressure air to maintain the plunger depressed and the plate 115 in its downward position clear of the throat of the chute 25. However, when the foot treadle is depressed to open the door 16 the switch 125 closes, energizing the valve 123 to close the same, and the switch 126 is opened to deenergize and open the valve 124, thus permitting the high pressure air to enter beneath the plunger 119 to raise the same against the opposing force of the low pressure air, thereby to move the plate 115 to its upward or horizontal position so as to bridge the throat of the chute 25. In this position of the plate 115, the conveyor elements 109 may be withdrawn to the forward end of the furnace adjacent the door for loading. After they have been loaded and positioned within the muffle 10, the door 16 may be closed by the upward movement of the pedal 17. The switches 126 and 125 reverse the positions of the valves 123 and 124 so as to exhaust the lower portion of the cylinder 121 and permit the low pressure air supplied to the upper portion thereof through the conduit 127 to return the bridging plate 115 to its vertical position adjacent the front wall of the chute 25. When the carburizing or heat treating operation has been completed the rod 111 is drawn forward, with the door 16 closed, thus pulling the conveyor elements to the throat of the chute 25 down which they then travel by gravity, permitting the treated parts thereon to be dumped one after the other through the chute 25 and into the quenching bath 26. The conveyor may be advanced to the throat of the quench chute at such rate, depending on the nature of the load and the rate of circulation of the quenching medium in the quench tank, as to keep the parts sufficiently separated to enable the oil to absorb the heat therefrom without local overheating at the base of the chute, whereby an even quench and uniform hardness is obtained. The atmosphere for the muffle 10 is exhausted through the vent 129 which extends from a point adjacent the lower end of the quenching chute 25, upwardly to above the level of the muffle and as it escapes into the open air, it is ignited by means of a pilot burner 101 having a conduit 102 connected to the gas line 31.

It will be noted, therefore, that after the parts have been loaded in the furnace and the door closed, they are continuously subjected to the atmosphere introduced through the conduit 106 into the muffle 10 until they enter the quenching bath.

The quench chute 25, as stated, is secured to the forward end of the muffle and is supported in part thereby. To provide additional support while permitting the forward expansion of the muffle, a bracket 130 (Figs. 1 and 8) is mounted on the forward wall of the furnace. Carried by the bracket 130 is a transverse plate 131 having two bolts 132 threaded therein and locked in place by nuts 133. The head 134 of the bolts 132 are machined flat and adjusted into engagement with the underside of the angular extension 112 of the chute 25. The muffle 10 is anchored at its after end by a pin 135 and as it is brought up to heat it expands forwardly, causing the quench chute to slide outwardly on the heads of the bolts 132. The overhanging ends of the plate 131 provide sufficient rigidity to give the required support to the chute 25 but are also sufficiently resilient to prevent binding of the muffle in the front wall of the furnace.

In the operation of the furnace the cup 108 containing the desired lithium compounds is inserted within the pot 97 and the burners in the various chambers 12, 38 and 39 ignited. When the cracking chamber 42 comes up to the required temperature, preferably around 1900° F., an air and gas mixture is introduced therein through the conduit 43. As stated heretofore, in case a heat treating atmosphere is desired, this mixture may be an ordinary combustible mixture of air and natural or manufactured gas. I prefer to employ a gas such as propane in the cracking chamber due to its uniformity and in such case the mixture may consist of approximately eighteen parts air to one part propane. When a carburizing atmosphere is desired, this mixture may be reduced to from five to ten parts air and one part propane. The gases are cracked within the chamber 39 and as stated pass through the condenser 87 where the temperature is reduced and the major portion of the water and heavy tars are removed from the gas. The gas is then passed into the pot 97 which is heated to a sufficient temperature by means of the burners 28' to vaporize a portion of the lithium compound within the cup 108. This vapor is picked up by the incoming gas and carried by it into the muffle 10 in which the work is placed.

The preferred charge within the cup 108 comprises a mixture of lithium carbonate and lithium chloride in the proportion of about 60% of the former and 40% of the latter, by weight, which has been fused together at a temperature of about 1800° F. With a fused mixture of these proportions, sufficient vaporization occurs at a temperature of about 1400° F. to create the desired atmosphere in the muffle. The amount of lithium salt required to produce a non-oxidizing and non-decarburizing and non-staining atmosphere in the muffle 10 is very small. With a muffle heated to 1400° F. and having a volume of approximately 20,000 cubic inches and provided with a mixture of air and gas entering the gas generator at the rate of about 500 cubic feet per hour, a six ounce charge of lithium salts composed of 40% lithium chloride and 60% lithium carbonate, heated in the vaporizer to a temperature of 1500° F., will supply sufficient lithium to the atmosphere within the muffle to maintain the same for a period of thirty hours or more in a condition which is neutral to steel so that neither oxidation, nor decarburization, nor staining thereof will occur. While it is desirable to maintain the charge in the vaporizing chamber at a temperature of at least 1500° F. for the salt mixture specified, the muffle 10 may be operated at temperatures ranging from 600° F. up to the maximum temperature that the muffle will withstand.

While the exact nature of the chemical reactions occurring in the charge in the cup 108 or between the generated vapors and the gases from the cracking unit 42 is not fully known, the following explanation is supported by a large amount of experimental evidence.

The lithium chloride within the cup at the temperature prevailing therein is reduced to lithium metal by reaction with the hydrogen of the carrier gas in accordance with the equation $$2LiCl + H_2 = 2Li + 2HCl$$

The hydrochloric acid so formed then reacts with the lithium carbonate or any lithium oxide in the cup to produce additional lithium chloride as follows:

$$2HCl + Li_2CO_3 = 2LiCl + H_2O + CO_2$$
$$2HCl + Li_2O = 2LiCl + H_2O$$

The lithium chloride formed by the above conversion reacts with hydrogen, as set forth above, to liberate a vapor of lithium metal.

In this manner the lithium carbonate is gradually converted to the chloride and thus to the metal as the process proceeds. The proportion of 40% lithium chloride and 60% lithium carbonate appears to be so balanced as to render the rate of conversion substantially proportional to the rate of dissipation of the lithium vapor into the furnace atmosphere, whereby the liberation of lithium vapor continues at a substantially uniform rate until the charge in the cup is almost entirely consumed. The material leaving the charge in the cup 108 and entrained by the combustion gas thus appears to be the vapor of lithium metal with possibly some lithium oxide. The lithium oxide if any, reacts with the carbon monoxide in the carrier gases to liberate lithium metal in accordance with the equation:

$$2Li_2O + CO = Li_2CO_3 + 2Li$$

The lithium is thus freed to combine with any oxygen in the furnace from whatever source, and the lithium carbonate of the above reaction is again broken down thermally within the furnace to lithium oxide liberating carbon dioxide or by reaction with hydrochloric acid gas to lithium chloride which by further reaction with hydrogen, is reduced to lithium metal. These reactions are then repeated with the lithium oxide so formed.

It should be noted that although the major portion of the water vapor is removed by the condenser 87 from the carrier gas introduced into the muffle, upon reheating of these gases to the muffle temperature further reactions occur in the gas mixture causing the formation of additional quantities of water vapor. The addition of the lithium vapor to the muffle gases has the effect of either reducing any water vapor which so forms at the instant of formation or precludes the formation thereof by interaction with the oxygen before it has an opportunity to combine with the hydrogen to form water vapor. Due to the much smaller amount of water vapor which is formed by reaction within the muffle or within the conduits leading thereto as compared with the amount which would be present in the absence of the condensing apparatus, the amount of lithium required to reduce or prohibit the formation of such water vapor is extremely small. This is true both when employing a heat treating mixture and a carburizing mixture within the muffle. In both cases the parts treated are neither oxidized, discolored, or stained in any manner by the atmosphere and come out of the furnace in a bright and clean condition.

The lithium in addition to protecting the parts from oxidation or decarburization in the case of the heat treating atmosphere, also serves in the case of the carburizing atmosphere to accelerate carburization to such an extent that penetration of carbide is obtained with a much less concentrated hydrocarbon atmosphere than heretofore. For instance, in ordinary gas carburization employing hydrocarbon gases such as propane, it is the practice to employ approximately one part of propane to two parts of air in order to obtain carburization at a rate which is sufficiently fast to render the process commercially practical. Mixtures of such concentration, however, are sooty in nature and deposit large quantities of carbon or soot upon the parts forming hard carbon scales thereon. As previously stated, applicant is enabled to employ a mixture of one part propane to from five to ten parts of air, which dilution produces a mixture which is substantially completely free of soot. The rate of carburization at such dilutions is much higher than that which is obtained with the ordinary carburizing mixture of two parts air to one part propane, and is of the order of .02 inch for the first hour and .01 inch for each succeeding hour at temperatures ranging from 1650° F. to 1700° F. Rapid carburization, at the ratio of gas and air specified, is also obtained at temperatures as low as 1500° F. This rapid carburization and effectiveness of the atmosphere at low temperatures is believed to result from the fact that the surface is maintained in a clean condition at all times during the carburizing process, and the oxidizing and deoxidizing phase of the usual carburizing equilibrium is eliminated. The ability to carburize at a rapid rate at temperatures between 1500° F. and 1600° F. is of considerable importance because steel in certain shapes tends to distort during carburization at higher temperatures. While I have referred to propane as the preferred carrier gas, it is to be understood that any type of carburizing gas may be employed.

It is to be understood that the furnace disclosed may be employed for either carburizing or heat treating merely by changing the proportion of air to hydrocarbon gas introduced into the cracking chamber 42. In case of heat treating furnaces alone, the cracking chamber 42 is not necessary since the composite gas mixture may be burned directly in the chamber 39 and exhausted therefrom into the muffle through the drying and cleaning apparatus 87.

It will be noted that the atmosphere producing unit comprising the control valves 74, 76, pump 77, cracking chamber 42, condenser 87, and vaporizing chamber 38, have no operative connection with the furnace comprising the muffle 10 and the heating means therefor, except the slip connection of the inlet conduit 106 with the rear of the muffle. Consequently the atmosphere producing unit may be made as a separate unit and employed with any suitable type of muffle furnace or otherwise as desired. It will also be understood that any suitable means may be provided for the purpose of preventing admission of air into the muffle during the time the door 16 is open, as for loading, etc. For instance, the branch conduits 71 and 72 may be provided with apertured plates 83 and 84 of such capacity as to provide a sufficient flow of gas through the muffle at all times to preclude admission of air thereto during opening of the door, or the admission of air into the muffle may be prevented by the provision of a flame curtain adjacent the door opening, or by a chain curtain or other suitable means.

In Fig. 9 I have shown a modified construction of the muffle and quenching chute which is particularly adapted for long muffles. In this form the underside of the muffle 10' is provided with a series of lugs 140 recessed to receive the trunnions of a series of rollers 141 which loosely ride therein. The rollers 141 rest upon flat plates 142 formed on the top of a series of pedestals 143 whereby the muffle is supported throughout its length at spaced intervals. If desired, reinforcing ribs 144 may be provided on the muffle intermediate the lugs 140. The spacing of the pedestals 143 from the aftermost to the foremost is slightly greater than that of the rollers 141 to compensate for the greater movement of the forward end of the muffle during expansion. By this means the muffle is supported throughout its entire length while permitted to expand forwardly as it is brought up to heat.

In order to obtain a more uniform distribution of the gaseous atmosphere, particularly when the furnace is used for carburization, the muffle is provided with a semicircular ridge 145 along its upper side into which is secured, as by welding, a pipe 146 having a series of slots or other openings 147 spaced along the bottom thereof. The pipe 146 is connected with the outlet of the lithium vaporizer, that is to the conduit 106 of Fig. 1, and the lithiated atmosphere produced therein enters the muffle through the openings 147. These openings are of increasing width from the after end to the forward end of the pipe so that the amount of atmosphere admitted to the muffle at each point will be substantially constant despite the decrease in pressure toward the forward end of the pipe 146. This introduction of the gas at spaced points along the muffle is important in the carburizing of certain shaped parts, since when the atmosphere is introduced only at the rear of the muffle, the flow of the gas through the muffle tends to produce an air flow effect on one side thereof which causes a reduced gas pressure on such side and causes a slight unevenness in the carburization. There is also a tendency toward a stagnation of the gas in vertical openings in the parts being carburized. This difficulty is entirely obviated with the overhead introduction of the gases since this causes a downward and turbulent flow of the gases in addition to the longitudinal movement thereof.

In the muffle of Fig. 9 I have shown a modified form of work conveying belt 109', this being in the form of a woven or mesh belt having a series of upstanding pivoted links along the sides thereof to form a trough. The belt is free at the forward end and is secured to a rod 111' at its rear end. The quench chute 25' is provided with the same throat member 115' described in connection with Fig. 1, across which the belt may be drawn through the door opening to enable the belt to be loaded with parts to be treated. After completion of the treatment, the rod 111' is drawn forward, with the door closed so that the throat member 115' occupies the vertical position against the front wall of the quench chute 25'. During this movement of the belt, the forward end thereof drops into the chute 25' by gravity, following the curved rails 114' and entering between the rails 114' and arcuate guide fingers 148, whereby the free end of the belt is directed into a receptacle 149 formed to the rear of the quench chute 25'. This work falls from the belt, at a regulated rate, as it passes over the rails 114', into the quench chute and thence into the quench tank 26. During the forward movement of the belt it accumulates in the chamber 149 and is thus protected from engagement with the quenching medium in the quench tank 26, which medium if permitted to contact the belt might deteriorate and dirty the same.

In order to produce a thorough circulation of the oil within the quench tank 26 there is shown in Fig. 11 a pair of circulating propellers 151, 152 disposed with their blades interleaved and driven from a common motor 153 through a sprocket drive 154. The shafts 155 and 156 of the blades rotate in suitable bearings 157 carried by brackets secured to the outer wall of the tank 26. The drive shaft 156 is driven at a reduced speed, preferably around 400 R. P. M., from the motor 153 by a suitable belt 158. In order to prevent stagnation of the oil within the lower end of the quench chute 25 I provide a deflecting plate 159 on one side thereof away from the blades 151 and 152, which causes a deflection and circulation of oil up into the lower end of the quench chute. This is essential in order that the oil will be in movement at the moment of contact with the piece being quenched, since the formation of oil vapor bubbles in the quench chute, which occurs with stagnant oil, prevents proper contact of the parts with the quenching medium. In the base of the quench tank is a mesh basket or receptacle 161 into which receives the parts dropped through the chute 25. This receptacle is also provided with a deflecting plate 162 to prevent stagnation of the oil therein. The basket rests upon suitable runners 160 by which it may be drawn forward of the quench chute for removal, when required. In shallow tanks where the basket 161 is relatively close to the lower end of the quench chute, a single circulating blade is sufficient, but in order to provide a greater oil capacity where a large quantity of parts are to be quenched, I prefer to employ a deep tank and to use the two blades as shown in Fig. 11, one approximately at the level of the lower end of the chute and the other approximately at the level of the top of the basket. By disposing the upper blades so as to interleave with the lower blades, and maintaining this relation by a sprocket drive, a substantially continuous movement of the oil is maintained and pulsations in the flow thereof eliminated. A pair of inclined side plates 163 extend inwardly and downwardly from opposite sides of the tank 26 to overhang the side edges of the basket and direct the work into the same.

As heretofore stated, it is at times desirable to alternate the carburizing cycle and the heating cycle in order that the carbides absorbed during the carburizing cycle may be more uniformly diffused into the steel during the heat treating cycle. For instance, it may be desired to operate the furnace with a carburizing atmosphere for a period of thirty minutes and then change to a neutral atmosphere for a further period of thirty minutes to permit diffusion of the carbides, and to repeat these cycles a number of times, depending upon the depth of the case desired. In Fig. 12 I have shown an automatic timing mechanism for effecting such control of the furnace atmosphere. The timing mechanism comprises a reversing self-starting alternating current synchronous motor 164, comprising a shaft 165 journaled in suitable bearings and having a pair of field windings 166 and 167 on iron cores 168 and 169, respectively, adapted to operate the motor in opposite directions when energized. The coil 166 is arranged to drive the shaft in a clockwise direction and the coil 167 to drive the shaft in a counter-clockwise direction. A second shaft 170, driven by the shaft 165 through reduction gearing 171, is journaled in bearings 172 and extends axially through a fixed disc 173 having suitable graduations thereon. The outer end of the shaft 170 carries contact arm 174 adapted to engage either of two adjustable contacts 175, 176 carried by brackets 177 and 178, respectively, journaled on a sleeve 179 so as to permit adjustment of the contacts 175 and 176 towards and away from each other circumferentially. A brush 180 provides an electrical connection for the shaft 170. The contacts 175 and 176 are connected, respectively, to the windings 181 and 182 of a control relay, the armature 183 of which carries two mercury switches 184 and 185. A pair of spaced contacts are provided at each end of the switches 184, 185, the right hand contacts of switch 184 controlling the field winding 166 and the left hand contacts thereof controlling the field winding 167, to drive the motor either clockwise or counterclockwise depending upon the position of the switch 184. The right hand contacts of switch 185 are connected through a manual switch 186 to the windings of the electric gas and air valves 74b, 76b, or 74c, 76c (Fig. 1), depending upon the position of the switch 186. The left hand contacts of switch 185 control the operation of the gas and air valves 74a and 76a.

Assuming that the furnace has been brought up to heat and it is desired to alternate a carburizing and a diffusing cycle, the switch 186 is operated to either its lower or upper contact depending upon the concentration of case desired in the steel to be carburized. The contact 175 is adjusted in contact with the arm 174 of the timing mechanism and the contact 176 is spaced therefrom a distance corresponding to the length of the carburizing cycle, as indicated by the graduations on the disc 173. The line switch 187 is then closed to complete a circuit from the B bus bar through the brush 180, shaft 170, arm 174, and contact 175, to the winding 181 of the control relay and thus to the A bus bar. The armature 183 is thus pivoted clockwise to the position shown whereby the right hand contacts of each of the mercury switches 184, 185 are bridged. The clockwise operating winding 166 of the driving motor is thus energized from the B bus bar and right hand contacts of switch 184 to the A bus bar, causing the shaft 165 to rotate clockwise and to thus start the travel of the arm 174 towards the upper contact 176. At the same time a circuit is completed from the B bus bar, through the right hand contacts of switch 185, and through switch 186 to the selected pair of gas and air valves 74b, 76b, or 74c, 76c. The control relay is of the type that remains in its last set position, so that the right hand terminals of the mercury switch remain bridged until the winding 182 of the relay is energized to reverse the position of the armature. This occurs at the time the contact arm 174 engages contact 176 and the elapsed period required for the arm 174 to travel from contact 175 to contact 176 determines the length of the carburizing cycle. Upon closure of the circuit through the contact 176, the winding 182 of the control relay is energized, reversing the position of the armature 183 and thereby opening the right hand contacts of the mercury switches and closing the left hand contacts. The left hand contacts of the switch 184 energize the field winding 167 of the driving motor to reverse the direction thereof and start the movement of the switch arm 174 back towards the contact 175. The left hand contacts of the switch 185 energize the electric valves 74a and 76a to change the ratio of gas and air admitted to the furnace whereby a neutral atmosphere is substituted for the carburizing atmosphere previously employed. This condition continues until the arm 174 engages contact 175 when the neutral atmosphere is again discontinued and a carburizing atmosphere substituted therefor as described above.

It will be understood, of course, that other timing mechanisms may be used and that many changes may be made in the physical structure of the furnace, in its control mechanisms and in its method of operation without departing from the essential attributes of the invention, and all such modifications and changes are contemplated as coming within the scope of the appended claims.

What I claim is:

1. A furnace comprising a heating chamber, a vaporizing chamber, means within said vaporizing chamber for supporting a receptacle adapted to hold a vaporizable material, a removable closure for said vaporizing chamber for the insertion and removal of said receptacle, means for heating said vaporizing chamber to a sufficient temperature to effect vaporization of said material at an appreciable rate, means for supplying a gaseous medium to said vaporizing chamber and means for conducting said gaseous medium from said vaporizing chamber into said heating chamber.

2. A furnace for the treating of metal comprising a heating chamber for such metal, a vaporizing chamber, a removable container for vaporizable material adapted to be supported in the base of said vaporizing chamber, a conduit extending from said vaporizing chamber into said heating chamber, a source of atmosphere for said heating chamber, a conduit extending from said source of atmosphere into said vaporizing chamber, and baffle means in said vaporizing chamber in the path of said atmosphere, said baffle means extending adjacent to but spaced above said removable container intermediate said conduits.

3. A furnace for the treating of metal comprising a heating chamber for such metal, a vaporizing chamber, a removable container for vaporizable material adapted to be supported in said vaporizing chamber, a conduit extending from said vaporizing chamber into said heating chamber, a gas generating chamber, a conduit extending from said gas generating chamber into said vaporizing chamber, and means for introducing fuel and air into said gas generating chamber for reaction therein.

4. A furnace for the treating of metal comprising a heating chamber for such metal, a vaporizing chamber, a removable container for vaporizable water reducing material adapted to be supported in said vaporizing chamber, a conduit extending from said vaporizing chamber into said heating chamber, a gas generating chamber, a conduit extending from said gas generating chamber into said vaporizing chamber, means for introducing fuel and air into said gas generating chamber for reaction therein, and water condensing means associated with said last mentioned conduit for removing a portion of the water from said reacted gases, the condensing capacity of said water condensing means being such relative to the vaporizing capacity of said vaporizing chamber for said water reducing material as to enable the elimination of substantially all water from said reacted gases entering said heating chamber to be effected.

5. A furnace for the treating of metal comprising a heating chamber for such metal, a vaporizing chamber, a removable container for vaporizable material adapted to be supported in said vaporizing chamber, a conduit extending from said vaporizing chamber into said heating chamber, a gas generating chamber, a conduit extending from said gas generating chamber into said vaporizing chamber, a plurality of gas and air mixing devices, and means for operatively associating any one of said gas and air mixing devices with said gas generating chamber for supplying a gas and air mixture thereto.

6. A furnace for the heat treating of metals comprising a muffle, a combustion chamber surrounding said muffle, a vaporizing receptacle, a combustion chamber surrounding said vaporizing receptacle, a conduit extending from said vaporizing receptacle into said muffle, a gas generating chamber, a conduit extending from said gas generating chamber into said vaporizing receptacle, burners extending into each of said chambers, means for supplying air and fuel gas to said burners, and means for varying the air and fuel gas supplied to each of said chambers independently.

7. A furnace for the heating of metals comprising a muffle, a closed combustion chamber surrounding said muffle, said combustion chamber having means for supplying a combustible mixture thereto and for exhausting the products of combustion therefrom, a second closed combustion chamber, means for introducing a carbonaceous gas and air mixture into said second combustion chamber, an exhaust conduit extending from said second combustion chamber into one end of said muffle, a third closed combustion chamber disposed about a portion of said conduit, means for supplying a combustible mixture into said third combustion chamber and means for exhausting the products of combustion therefrom, means for confining a vaporizable material within the portion of said conduit disposed within said third combustion chamber and in the path of the exhaust gases passing from said second combustion chamber to said muffle, an exhaust outlet for said muffle disposed at the opposite end thereof from said conduit, a door normally closing said muffle and means for operating said door to permit the introduction and removal of material to be heated into and from said muffle.

8. A furnace for the heating of metals comprising a muffle, means for heating said muffle, a gas generating chamber, means for introducing a carbonaceous gas and air mixture into said gas generating chamber for reaction therein, an exhaust conduit extending from said gas generating chamber into said muffle, heating means for a portion of said conduit, means for confining a vaporizable material within the portion of said conduit subject to said heating means and in the path of the exhaust gases passing from said gas generating chamber to said muffle, an exhaust outlet for said muffle, means normally closing said muffle, said means permitting the introduction and removal of material to be heated into and from said muffle.

9. A furnace for the heating of metals comprising a muffle, means for heating said muffle, a gas generating chamber, means for introducing a carbonaceous gas and air mixture into said gas generating chamber for reaction therein, an exhaust conduit extending from said gas generating chamber into said muffle, heating means for a portion of said conduit, a recess in the portion of said conduit subject to said heating means and in the path of the exhaust gases passing from said gas generating chamber to said muffle, a removable closure for said conduit adjacent said recess and an exhaust outlet for said muffle to permit the egress of the muffle atmosphere.

10. In a metallurgical furnace, the combination of a heating chamber, a gas generating chamber, a vaporizing chamber, passageways extending from said gas generating chamber to said vaporizing chamber and from said vaporizing chamber to said heating chamber, heating means for each of said chambers, means for supplying a mixture of gas and air to said gas generating chamber and means for varying the ratio of said gas and air mixture.

11. In a metallurgical furnace, the combination of a heating chamber, a gas generating chamber, a vaporizing chamber, a gas drying chamber, passageways extending from said gas generating chamber to said drying chamber, from said drying chamber to said vaporizing chamber and from said vaporizing chamber to said heating chamber, heating means for each of said heating, gas generating and vaporizing chambers, means for supplying a mixture of gas and air to said gas generating chamber and means for varying the ratio of said gas and air mixture.

12. In a metallurgical furnace, the combination of a heating chamber, a gas generating chamber, a vaporizing chamber, passageways extending from said gas generating chamber to said vaporizing chamber and from said vaporizing chamber to said heating chamber, heating means for each of said chambers, means including a pump for supplying a mixture of gas and air to said gas generating chamber and means for varying the ratio of said gas and air mixture.

13. In a metallurgical furnace, the combination of a heating chamber, a gas generating chamber, a vaporizing chamber, passageways extending from said gas generating chamber to said vaporizing chamber and from said vaporizing chamber to said heating chamber, heating means for each of said chambers, a gas and air mixing device having separate air and gas inlets and metering means in each of said inlets for supplying a mixture of gas and air to said gas generating chamber.

14. In a metallurgical furnace, the combination of a heating chamber, a gas generating means, a vaporizing means, means for passing gas from said gas generating means to said vaporizing means and thence to said heating chamber, means for supplying a mixture of gas and air to said gas generating means, means for varying the ratio of said gas and air mixture, and timing means for altering the ratio of gas and air at predetermined intervals.

15. In a metallurgical furnace, the combination of a heating chamber, a gas generating chamber, a vaporizing chamber, passageways extending from said gas generating chamber to said vaporizing chamber and from said vaporizing chamber to said heating chamber, and a plurality of separate means for supplying mixtures of gas and air of different proportions to said gas generating chamber.

16. In a metallurgical furnace, the combination of a muffle, a source of gas, a vaporizing chamber, a passageway from said source of gas to said vaporizing chamber, and a passageway from said vaporizing chamber to said muffle, said latter passageway having a plurality of outlets within said muffle.

17. In a metallurgical furnace, the combination of a muffle, a gas generating chamber, a vaporizing chamber, heating means for each of said chambers, means for introducing a gas and air mixture into said generating chamber, a passageway from said generating chamber to said vaporizing chamber, a passageway from said vaporizing chamber to said muffle, said latter passageway having a plurality of outlets within said muffle disposed at spaced points therealong.

18. A generating unit for metallurgical furnaces comprising a gas generator, a vaporizing chamber having inlet and outlet passageways, a conduit extending from said gas generator to said inlet passageway whereby gases produced in said generator may flow through said vaporizing chamber, means for retaining a vaporizable material in a portion of said vaporizing chamber disposed to one side of the path of flow of said gases through said chamber and means for heating said portion of said vaporizing chamber.

19. A generating unit for metallurgical furnaces comprising a gas generator, a vaporizing chamber having inlet and outlet passageways, a conduit extending from said gas generator to said inlet passageway whereby gases produced in said generator may flow through said vaporizing chamber, means associated with said conduit for extracting at least a part of the water contained in said gases, means for retaining a vaporizable material in a portion of said vaporizing chamber disposed to one side of the path of flow of said gases through said chamber and means for heating said portion of said vaporizing chamber.

20. A gas generating unit for metallurgical furnaces comprising a gas generating chamber, a vaporizing chamber, a passageway extending from said gas generating chamber to said vaporizing chamber and from said vaporizing chamber to said heating chamber, heating means for each of said chambers, means for supplying a mixture of gas and air to said gas generating chamber and means for varying the ratio of said gas and air mixture.

21. A gas generating unit for metallurgical furnaces comprising a gas generating chamber a vaporizing chamber, a passageway extending from said gas generating chamber to said vaporizing chamber and from said vaporizing chamber to said heating chamber, means including a pump for supplying a mixture of gas and air to said gas generating chamber and means for varying the ratio of said gas and air mixture.

22. A furnace comprising a heating chamber, a vaporizing chamber communicating with said heating chamber, means for introducing a vaporizable material into said vaporizing chamber, means for heating said vaporizing chamber to a sufficient temperature to effect vaporization of said material at an appreciable rate, and means for passing a gaseous medium through said vaporizing chamber.

23. In a metallurgical furnace, the combination of a heating chamber, a vaporizing chamber, means for introducing a vaporizable material into said vaporizing chamber, means for heating said vaporizing chamber, an inlet conduit for said vaporizing chamber for admitting a gaseous medium therein and an outlet conduit for removing said gaseous medium therefrom, said outlet conduit communicating with said heating chamber at a plurality of spaced points therein.

24. A furnace for the treating of metals comprising a heating chamber for such metal, a vaporizing chamber communicating with said heating chamber, a removable container for the vaporizable material adapted to be supported in said vaporizing chamber, a source of atmosphere for said vaporizing chamber, means for directing a gaseous medium through said vaporizing chamber and into said heating chamber and baffle means in said vaporizing chamber in the path of said gaseous medium for deflecting same into contact with said vaporizable material.

HAROLD J. NESS.